US012157313B2

(12) United States Patent
Shklyarevskiy et al.

(10) Patent No.: US 12,157,313 B2
(45) Date of Patent: Dec. 3, 2024

(54) INKJET PRINT HEAD WITH CONTINUOUS FLOW AND PRESSURE PULSE DAMPENING

(71) Applicant: CANON KABUSHIKI KAISHA, Tokyo (JP)

(72) Inventors: Igor Shklyarevskiy, Nijmegen (NL); Hans Reinten, Velden (NL); Klaas Verzijl, Well (NL); Youri De Loore, Genk (BE)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 17/931,722

(22) Filed: Sep. 13, 2022

(65) Prior Publication Data

US 2023/0082159 A1 Mar. 16, 2023

(30) Foreign Application Priority Data

Sep. 16, 2021 (EP) .................................... 21197240

(51) Int. Cl.
*B41J 2/14* (2006.01)
*B41J 2/16* (2006.01)

(52) U.S. Cl.
CPC ......... *B41J 2/14201* (2013.01); *B41J 2/1607* (2013.01); *B41J 2/1623* (2013.01)

(58) Field of Classification Search
CPC .... B41J 2/14201; B41J 2/1607; B41J 2/1623; B41J 2/14145
See application file for complete search history.

(56) References Cited

U.S. PATENT DOCUMENTS

| | | | | |
|---|---|---|---|---|
| 10,391,768 | B2 | 8/2019 | Reinten | |
| 2013/0208059 | A1* | 8/2013 | Arimoto | B41J 2/14233 347/85 |
| 2016/0059555 | A1* | 3/2016 | Tamura | B41J 2/14201 347/68 |
| 2017/0072692 | A1 | 3/2017 | Chen et al. | |
| 2020/0031134 | A1 | 1/2020 | Mizuno | |
| 2020/0316942 | A1* | 10/2020 | Mizuno | B41J 2/14145 |
| 2021/0162756 | A1 | 6/2021 | Hirata | |

FOREIGN PATENT DOCUMENTS

EP 2990205 B1 10/2019

* cited by examiner

*Primary Examiner* — Jason S Uhlenhake
(74) *Attorney, Agent, or Firm* — Canon U.S.A., Inc. I.P. Division

(57) ABSTRACT

An inkjet print head includes a plurality of droplet jetting devices. The plurality of droplet jetting devices is formed of a nozzle layer defining, for each of the plurality of droplet jetting devices, a nozzle, a membrane layer carrying, on a membrane, a restrictor layer and an actuator for generating pressure waves in a liquid in a pressure chamber that is connected to the nozzle. The actuator is positioned in an actuator chamber in the restrictor layer, and a distribution layer defining a supply line for supplying the liquid to the pressure chamber. The restrictor layer includes an inlet restrictor having a cross-section and an outlet restrictor positioned on opposites sides of the actuator and having a cross-section that is different from the cross-section of the inlet restrictor.

19 Claims, 2 Drawing Sheets

INKJET PRINT HEAD WITH CONTINUOUS FLOW AND PRESSURE PULSE DAMPENING

BACKGROUND

Field

The disclosure relates to an inkjet print head, as well as to a method for forming such a print head.

Description of the Related Art

Inkjet print heads are known, for example from U.S. Pat. No. 10,391,768. Such a print head comprises a plurality of droplet jetting devices formed of a nozzle layer defining, for each droplet jetting device, a nozzle, a membrane layer carrying, on a membrane, a restrictor layer and an actuator for generating pressure waves in a liquid in a pressure chamber that is connected to the nozzle, the actuator being positioned in an actuator chamber in the restrictor layer, and a distribution layer defining a supply line for supplying the liquid to the pressure chamber. It is further known to provide the pressure chamber with an additional outlet to allow for a constant throughflow of ink through the pressure chamber, for example from U.S. Patent App. Pub. No. 2020/0031134, wherein the restrictor layer comprises an inlet and an outlet restrictor positioned on opposites sides of the actuator. The inlet and outlet restrictors however form passages which allow pressure waves generated in one pressure chamber to travel to an adjacent pressure chamber, which could affect the droplet formation there. It is known to provide a print head with so-called cross-talk dampers formed of a flexible membrane, for example from U.S. Patent App. Pub. No. 2017/0072692.

SUMMARY

Disclosed herein is an inkjet print head that is a space-efficient print head with cross-talk filtering and improved performance and/or lifetime.

According to an aspect of the present disclosure, an inkjet print head includes a plurality of droplet jetting devices formed of a nozzle layer defining, for each of the plurality of droplet jetting devices, a nozzle, a membrane layer carrying, on a membrane, a restrictor layer and an actuator for generating pressure waves in a liquid in a pressure chamber that is connected to the nozzle, wherein the actuator is positioned in an actuator chamber in the restrictor layer, and a distribution layer defining a supply line for supplying the liquid to the pressure chamber, and wherein the restrictor layer includes an inlet restrictor having a cross-section and an outlet restrictor positioned on opposites sides of the actuator and having a cross-section that is different from the cross-section of the inlet restrictor.

The present disclosure will become more fully understood from the detailed description given herein below and the accompanying drawings which are given by way of illustration only, and thus are not limitative of the present disclosure.

DESCRIPTION OF THE EMBODIMENTS

Figure 1:
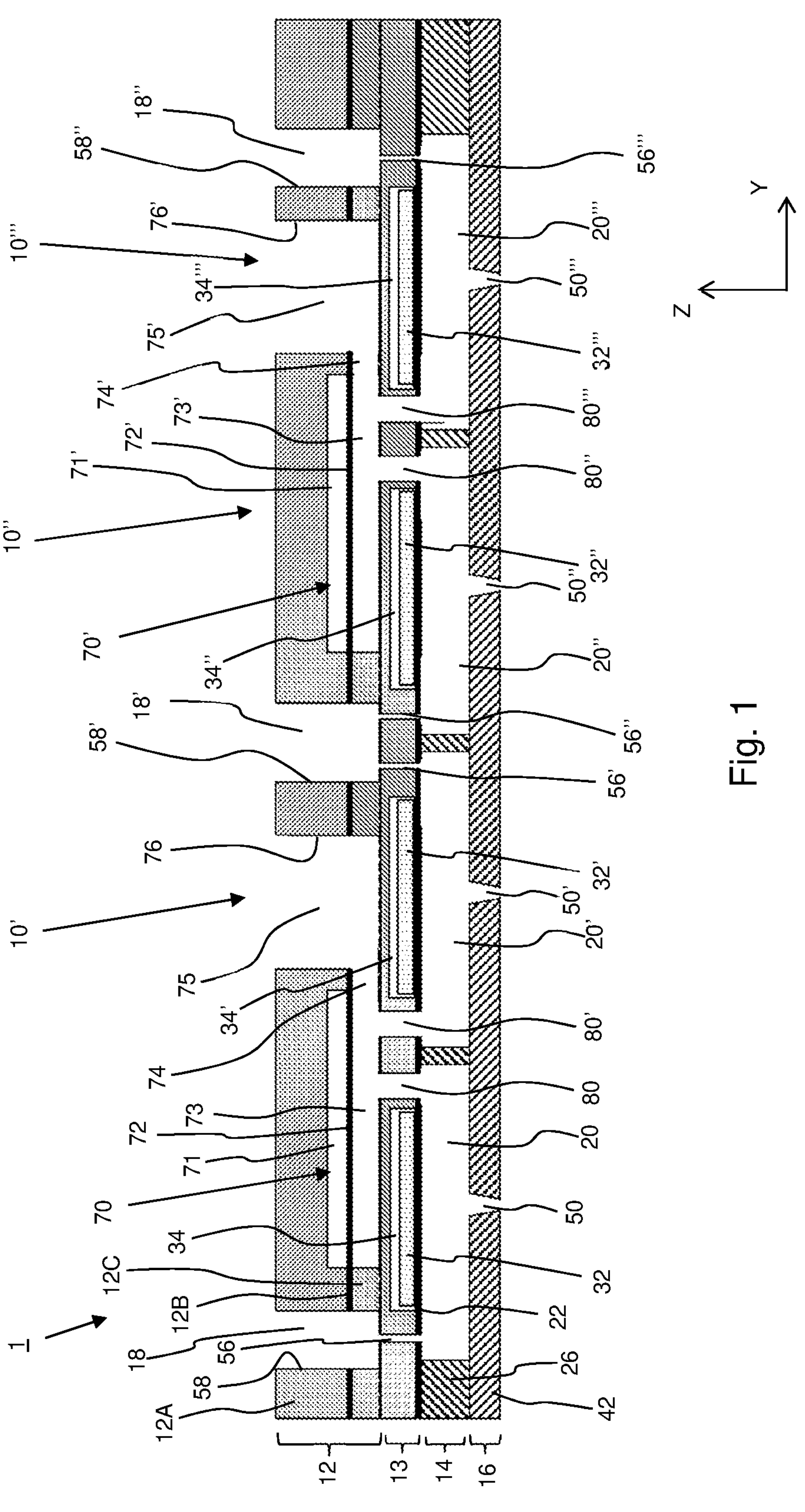
FIG. 1 is a schematic cross-sectional view of a portion of print head according to the present disclosure.

Embodiments of the present disclosure are described in detail below. The inkjet print head comprises a plurality of droplet jetting devices formed of a nozzle layer defining, for each droplet jetting device, a nozzle, a membrane layer carrying, on a membrane, a restrictor layer and an actuator for generating pressure waves in a liquid in a pressure chamber that is connected to the nozzle, the actuator being positioned in an actuator chamber formed in the restrictor layer, and a distribution layer defining a supply line for supplying the liquid to the pressure chamber, wherein the restrictor layer comprises an inlet restrictor and an outlet restrictor positioned on opposites sides of the actuator. In the present disclosure, the print head is defined by that a cross-section of the inlet restrictor is different from that of the outlet restrictor. The cross-section of the inlet restrictor may be smaller than that of the outlet restrictor or vice versa, which allows one of the restrictors to have the additional functionality of acting as a particle filter and/or cross-talk filter, which prevents respectively particles and/or pressure pulses from passing through the restrictor. The other one of the restrictors then has the larger cross-section to enable a higher through-flow and/or act as a sufficiently large outlet for particles to pass through to remove the particles from the pressure chamber. The chance of particles residing in the pressure chamber and negatively affecting the performance of the droplet jetting device is thereby reduced, while preventing cross-talk between pressure chambers. The inlet and outlet restrictors are further formed in the restrictor layer, wherein also the actuator chamber is provided. This results in a compact design with a small footprint, which is advantageous for achieving a high nozzle density.

In an embodiment, the cross-section of the inlet restrictor is smaller than that of the outlet restrictor, preferably no greater than half of the cross-section of the outlet restrictor. The cross-section or effective area of the inlet restrictor is preferably less than that of the outlet restrictor. The cross-section of the inlet restrictor may in one embodiment be sufficiently small to substantially prevent particles larger than a predetermined size as well as pressure waves originating from an actuation of the actuator from passing through it. The inlet restrictor is the narrower of the two restrictors such that it acts as a particle filter and a cross-talk damper, while the outlet restrictor is sufficiently large to allow particles to exit the pressure chamber. Thereby the chance of particles entering the pressure chamber is reduced as well as the effectiveness by which such particles may be removed from the pressure chamber. Since the restrictors are adjacent the pressure chamber, this manner of filtering and removing particles is highly effective. This improves the performance and lifetime of the droplet jetting device. Also, the chance of particles residing in and contaminating the pressure chamber is reduced.

In an embodiment, the cross-sectional area of the inlet restrictor is between 500 and 1600 $\mu m^2$, preferably between 600 and 1200 $\mu m^2$. The inlet restrictor may for example have a cross-section between $25 \times 25$ $\mu m^2$ and $125 \times 125$ $\mu m^2$. The outlet restrictor's diameter is larger, preferably at least twice, thrice, or more than that of the inlet restrictor, very preferably over 1600 $\mu m^2$, for example at least $150 \times 150$ $\mu m^2$. The inlet restrictor's cross-section may be selected based upon the print head's application and properties of the ink to be applied to the print head.

In an embodiment, the restrictors are formed as straight passages extending perpendicular to the membrane through the full thickness of the restrictor layer. The restrictors have a substantially uniform cross-section through the full thickness of the restrictor layer. Substantially uniform is herein defined to also include minor deviations due to the restrictor formation process, for example by means of photolithographic etching. Both restrictors are further preferably parallel to a stacking direction perpendicular to the plane of the layers forming the droplet jetting device. The restrictor layer is therein bonded to the membrane, such that the restrictors are aligned with their respective openings in the membrane.

In an embodiment, the distribution layer further comprises a damper element formed of a first damper chamber and a flexible damper membrane, the damper membrane and first damper chamber being positioned over the outlet restrictor. The damper membrane seals off the first damper chamber, thereby allowing the damper membrane to deform when a pressure pulse or fluctuation reaches the damper element. Such a pressure pulse may be absorbed by the damper element and prevented from travelling into another pressure chamber. The damper element is positioned over the outlet restrictor, such that these overlap when viewed in the stacking direction. A second damper chamber is positioned between the membrane and the outlet restrictor, which second damper chamber is in fluid connection with the outlet restrictor as well as with a return line, such that ink may be removed from the pressure chamber. The cross-section of the outlet restrictor is sufficiently large to allow any particles to exit the pressure chamber. The outlet restrictor extends in the stacking direction, which is generally against the direction of gravity during use. This allows for an efficient removal of gas bubbles. Similarly, gas bubbles are less likely to pass downwards into the pressure chamber through the vertical inlet restrictor. Due to its narrow cross-section no damper element needs to be provided over the inlet restrictor. Instead a supply line is preferably positioned vertically over the inlet restrictor to create a space efficient supply structure.

In an embodiment, the first damper chamber and the damper membrane extend partially over the actuator chamber. To achieve a compact design, the damper element partially overlaps the actuator chamber, when viewed in the stacking direction. In consequence, the average footprint of an individual droplet jetting device is relatively small allowing for a high nozzle density. The damper element is preferably integrated in the distribution layer and positioned between a supply line and a return line in connection to the respective pressure chamber over which the damper element extends. Between is herein preferably intended when viewed in a width direction of the actuator parallel to a plane of the membrane. The distribution layer may in an embodiment be formed of two wafers or sheets bonded together on opposite sides of a damper membrane film, wherein the first and second damper chambers are provided in different ones of the wafers or sheet at corresponding positions.

In an embodiment, the inlet and outlet restrictors of neighboring droplet jetting devices alternate their relative positions, such that the outlet restrictors and inlet restrictors of neighboring droplet jetting devices are respectively positioned adjacent to one another. At each separation wall between two neighboring pressure chambers either two inlet restrictors or two outlet restrictors are positioned, one at each side of the separation wall. This may be achieved by e.g. a 12211221 . . . pattern of the different types of restrictors. At the separation walls restrictors of the same type (i.e. inlet or outlet) are positioned in close proximity to one another, allowing these to be connected to a single line or chamber in the layer above the restrictor layer. Preferably, a single supply line is formed in the distribution layer over each pair of neighboring inlet restrictors. Both neighboring inlet restrictors may thus be supplied via the single supply line, which is formed in the distribution layer over both the inlet restrictors and the separation wall. Likewise, a single return line may be connected to neighboring pairs of outlet restrictors. In an embodiment, a single damper element is formed in the distribution layer over each pair of neighboring restrictors, specifically outlet restrictors. The damper element for example overlaps both outlet restrictors and may be formed by having the first and second damper chambers extend over both outlet restrictors. The second damper chamber therein acts as a channel connecting both outlet restrictors to the return line, preferably via an outlet channel extending facing and parallel to a plane of the membrane layer. To achieve a space efficient configuration, the damper element may in an embodiment be connected to a return channel, the return channel being positioned over an actuator chamber and between a supply line and a damper element in the distribution layer. For neighboring outlet restrictors, the damper element may, at least for a major portion, be positioned over one of one of the pressure chambers corresponding to the outlet restrictors, while the return line is positioned over the other of the pressure chambers, where the return line is also located. The damper element therein extends over both outlet restrictors and with a minor portion laying over the other of the pressure chambers. In consequence, the return line is positioned over the actuator chamber of the other of the pressure chambers. The damper element does not extend over this pressure chamber as far as over the first one of the pressure chambers, such that there is space for the return line over this actuator chamber. The return line is then positioned between this latter damper element and a supply line connected to the inlet restrictor of the other of the pressure chambers. As such, the damper element, supply lines, and return lines may be positioned substantially within the footprint of the pressure chambers. This vertical overlapping configuration allows the width of the pressure chamber to effectively determine the nozzle spacing and resolution.

In an embodiment, the distribution layer is provided on the restrictor layer. The distribution layer is preferably bonded directly on the restrictor layer, e.g. by an adhesive or other type of chemical bonding. Preferably, the distribution layer is formed of two wafers bonded on opposite sides of a damper membrane film. This allows for a relatively simple construction of the restrictor layer and distribution layers, as these can be formed of no more than four layers (ignoring adhesive or bonding layers), specifically three wafers and a membrane film. For example, the distribution layer may be formed of two etched silicon wafers bonded on opposite sides of a damper membrane film. Both the wafers can be etched to form the passages for supply and return lines as well as the first and second actuator chambers including an outlet channel between the second damper chamber and the return line. The distribution layer is bonded onto the restrictor layer which may be formed of a single wafer provided with passages for inlet and outlet restrictors as well as an actuator chamber. The passages are formed as through-holes, while the actuator may be formed as a recess or as a through-hole. The restrictor layer in turn is bonded onto the membrane, such that the actuator is sealed by the membrane in the actuator chamber and positioned over the pressure chamber, which is formed on an opposite side of the membrane. The pressure chamber is completed by adhering the nozzle layer to the membrane layer.

In an embodiment, the print head according to the present disclosure comprises four droplet jetting devices positioned in a row, wherein the inlet restrictors of the central droplet jetting devices are positioned besides one another with a single supply channel extending over both inlet restrictors, and wherein each pair of an outer droplet jetting device and its neighbor comprise a damper element positioned over both outlet restrictors and at least one of the actuator chambers of the droplet jetting devices and an outlet channel connected to a second damper chamber of the damper element and to both outlet restrictors, which outlet channel extends over only one of the actuator chambers of the droplet jetting devices. With the exception of the outer ends of the row, respectively the inlet restrictors and outlet restrictors are spatially grouped together, in close proximity to one another on opposite sides of a separation wall between pressure chambers. Effectively, along the direction of the row in the restrictor layer, one finds in order, an inlet restrictor, an actuator chamber, a pair of outlet restrictors, an actuator chamber, a pair of inlet restrictors, an actuator chamber, a pair of outlet restrictors, an actuator chamber, and an inlet restrictor. A single damper element is provided over neighboring outlet restrictors, which outlet restrictors are connected to the same return line. Neighboring inlet restrictors are supplied via the same supply line. The inlet restrictors at the outer ends of the row are provided with an individual supply line. Consequently, the row structure of the distribution layer there provides in order a supply line, a damper element, a return line, a supply line, a damper element, a return line, and a supply line. The pairs of respective restrictors are each connected to their respective supply or return line. This structure may be repeated perpendicular to the row direction to create a large array of nozzles.

The present disclosure further relates to a method of forming an inkjet print head, comprising the steps of:

- forming a restrictor layer comprising actuator chamber recesses and inlet passages for inlet restrictors and outlet passage for outlet restrictors, wherein a cross-section of the inlet passages is smaller than that of the outlet passages, and wherein between neighboring actuator chamber recesses either a pair of inlet passages or a pair of outlet passages is provided in an alternating manner;
- attaching a membrane layer comprising actuators bonded on a flexible membrane to the restrictor layer, such that each actuator is sealed in its respective actuator chamber recess by the flexible membrane;
- attaching a nozzle layer to the membrane layer, such that pressure chambers are formed on an opposite side of the flexible membrane, wherein each pressure chamber is in fluid connection with a respective inlet passage, outlet passage, and a nozzle formed in the nozzle layer.

The restrictor layer may be formed of a single wafer by etching through-holes for the passages. The passages preferably have a uniform cross-section, wherein the cross-section of the inlet passages is different, specifically smaller, than that of the outlet passages. The actuator chamber recess is formed by partially etching the wafer in between inlet and outlet restrictor passages. The membrane layer comprises a flexible membrane with multiple actuators on it. The flexible membrane is provided with openings aligned with the inlet and outlet passages in the restrictor layer, such that when bonded together the passages are in fluid connection to the pressure chamber, which is formed by mounting the nozzle layer on the membrane layer. The membrane or nozzle layer may comprise the side or separation walls of the pressure chambers. In the stacking direction, the inlet and outlet passages as well as the actuator chamber recesses are within the footprint or circumference of each respective pressure chamber. This allows for a high nozzle density.

In an embodiment, the method according to the present disclosure further comprises the steps of:

- forming a distribution layer by bonding a first and a second distribution wafer to opposite sides of a flexible damper membrane film, wherein the distribution layer comprises supply lines, return lines, and damper elements formed by recesses formed in the first wafer and sealed by the damper membrane film;
- attaching the distribution layer to the restrictor layer, such that a damper elements is positioned over each pair of neighboring outlet restrictors. The majority of the damper element is thereby positioned over a pressure chamber and/or actuator chamber, resulting in a small footprint of each droplet jetting device. For neighboring pressure chambers and/or actuator chambers, the damper element is preferably positioned for a major portion (preferably of at least 70%) over one of pressure chambers and/or actuator chambers, and with a smaller portion over the other of the neighboring pressure chambers and/or actuator chambers. Additionally, for pairs of neighboring droplet jetting devices the return line may be positioned over one pressure and/or actuator chamber while the majority of the damper element extends over the other pressure and/or actuator chamber. This is especially advantageous when such a pair of neighboring droplet jetting devices the outlet passages are positioned adjacently, allowing the damper element to extend over both outlet passages. Similarly, where two inlet passages are in neighboring positions, these may be supplied by a single supply line. Preferably, the supply line extends as a trench in the stacking direction over the inlet restrictor. This manner of overlapping preferably repeats in an alternating manner in the direction of the row of droplet jetting devices.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

The present disclosure will now be described with reference to the accompanying drawings, wherein the same reference numerals have been used to identify the same or similar elements throughout the several views.

Figure 2:
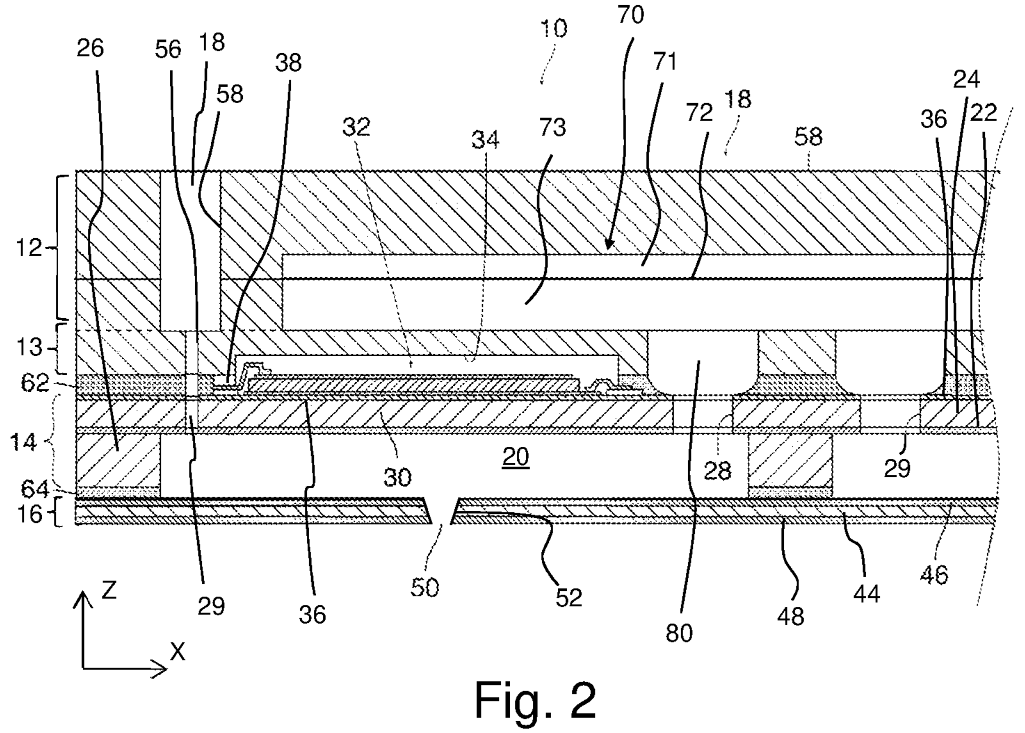
FIG. 2 is a schematic cross-sectional view of an embodiment of a droplet jetting device of the print head in FIG. 1.

FIG. 1 shows a cross-section of a MEMS chip as part of an inkjet print head 1. FIG. 2 shows an enlarged view of a single droplet jetting device 10, specifically the left most droplet jetting device which was integrated into the MEMS chip in FIG. 1. The MEMS chip may be used in an ink jet print head 1 for various applications, such as the printing as images or other 2D or 3D structures, like components or electronics. The MEMS chip and, accordingly, the jetting devices 10 have a layered structure comprising as main layers a distribution layer 12, a restrictor layer 13, a membrane layer 14, and a nozzle layer 16.

The distribution layer 12 is formed of multiple single silicon layers, which together have a relatively large thickness as compared to the other layers 13, 14, 16. The distribution layer 12 defines an ink supply line 18 through which liquid ink may be supplied from an ink reservoir (not shown) to a pressure chamber 20-20''' that is formed on the bottom side of the membrane layer 14. The ink reservoir is common to a plurality of jetting devices and is formed separately from the distribution layer 12 on the top side of the distribution layer, i.e. on the side opposite to the membrane layer 14. As shown in FIG. 1, the distribution layer 12 is further provided with a return line 75-75' for transporting ink out of the pressure chamber 20-20''', for example back to the ink reservoir. This allows for a continuous flow of ink through the pressure chamber 20-20''', even when the actuator 32-32''' is inactive. This constant throughflow prevents ink from stagnating in the pressure chamber 20-20''' and allows particles such as dirt or gas bubbles to be removed from the pressure chamber 20-20''', thereby improving the performance and lifetime of the droplet jetting device 10-10'''. A damper element 70-70' is also formed in the distribution layer 12 by means of a first damper chamber 71-71' and a deformable damper membrane 72-72'.

The membrane layer 14 is obtained from a SOI wafer having an insulator layer 22 and silicon layers 24 and 26 formed on both sides thereof. The pressure chamber 20-20''' is formed in the bottom silicon layer 26. The top silicon layer 24 and the insulator layer 22 form a continuous flexible membrane 30 with uniform thickness which extends over the entire area of the MEMS chip and is pierced by openings 28, 29 at the positions of the inlet restrictors 56-56' and the outlet restrictors 80-80''' respectively, so as to connect the ink supply line 18 to the pressure chamber 20-20' and the pressure chamber 20-20''' to the return line 75-75'. A piezoelectric actuator 32-32' is formed on the top side of the part of the membrane 30 that covers the pressure chamber 20-20'''. The actuator 32-32' is accommodated in an actuator chamber 34-34''' formed at the bottom side of the restrictor layer 13. The restrictor layer 13 is positioned between the membrane layer 14 and the distribution layer 12. Aside from the actuator chamber 34-34''', the restrictor layer 13 defines an inlet restrictor 56-56' and an outlet restrictor 80-80''', connected respectively to the supply line 18-18'' and the return line 75-75'. The actuator chamber 34-34' is formed as a recess having a height less than the thickness of the restrictor layer 13. The actuator chamber 34-34''' in the cross-sectional view in FIG. 2 is positioned between the inlet restrictor 56-56''' and the outlet restrictor 80-80'''.

An electrically insulating silicon oxide layer 36 insulates the actuator 32-32''' and its electrodes from the silicon layer 24 and carries electric leads 38 arranged to contact the electrodes on the top and bottom sides of the actuator 32-32'''. The leads 38 are partially exposed and extend towards a contact region (not shown) where the distribution layer 12 has been locally removed. The inlet restrictor 56-56''' and the outlet restrictor 80-80''' are formed as a passage with a constant or uniform cross-section and extend through the full thickness of the restrictor layer 13 in the stacking direction Z. The width and/or cross-section of the inlet restrictor 56-56''' is significantly smaller than that of the trench 58 forming the supply line 18-18''. The outlet restrictor's effective diameter in turn is substantially smaller than that of the return line 75. Narrow restrictors 56-56''', 80-80''' improve the control over the pressure wave in the pressure chamber 20-20'.

The nozzle layer 16 is obtained from an SOI wafer and has a thin silicon layer 44 interposed between two insulator layers 46 and 48. By etching a channel 52, a nozzle 50-50' is formed in the two insulator layers 46 and 48 and in the silicon layer 44 intervening between them, so that the thickness of these three layers defines the length of the nozzle 50-50'''. The nozzle 50-50' is positioned at a middle or central portion of the pressure chamber 20-20''', between in the inlet restrictor 56-56''' and the outlet restrictor 80-80''', in the cross-sectional view of FIGS. 1 and 2.

It will be understood that the droplet jetting devices 10-10''' of the MEMS chip are arranged such that their nozzles 50-50' define a nozzle array consisting for example of four or even more parallel nozzle lines with uniform nozzle-to-nozzle spacings which will determine the spatial resolution of the print head. Within the contact region, each of the leads 38 can be contacted, e.g. via bumps or contact pads, so that energizing signals in the form of electric voltage pulses may be applied individually to each actuator 32-32'''. When a voltage is applied to the electrodes of the actuator 32-32''', the piezoelectric material of the actuator is caused to deform in a bending mode, thereby flexing the membrane 30 and consequently changing the volume of the pressure chamber 20-20'''. Typically, a voltage pulse is applied to the actuator to cause a deformation that increases the volume of the pressure chamber 20-20', so that ink is sucked-in from the supply line 18. Then, when the voltage pulse drops off or changes into a pulse with opposite polarity, the volume of the pressure chamber 20-20''' is decreased abruptly, so that an acoustic pressure wave is generated which propagates through the pressure chamber 20-20''' and through the nozzle 50-50', with the result that a droplet of ink is jetted-out from the nozzle 50-50'''.

The print head MEMS chip in FIG. 1 comprises four neighboring droplet jetting devices 10-10''', the pressure chambers 20-20''' of which are identically in size. Each pressure chamber 20-20''' has three openings: the nozzle 50-50''', the inlet restrictor 56-56''', and the outlet restrictor 80-80'''. For each of the four droplet jetting devices 10-10''' the nozzle 50-50''' is in the same central position with respect to the pressure chamber 20-20'''. The inlet restrictors 56-56''' and outlet restrictors 80-80' alternate in their relative positions from one four droplet jetting device 10-10''' to the next. In consequence, on the respective sides of neighboring four droplet jetting devices 10-10''' either the restrictors 56-56''' or outlet restrictors 80-80' positioned adjacently at the separation walls between the pressure chambers 20-20''' neighboring droplet jetting devices 10-10'''.

Each inlet restrictor 56-56''' has a substantially smaller cross-section than its respective outlet restrictor 80-80'''. The inlet restrictor 56-56' is formed as a passage with a uniform cross-section over the full length of the passage, which passage extends through the entire restrictor layer 13. The outlet restrictor 80-80''' is formed in a similar manner on an opposite of the actuator chamber 32-32' and width a larger cross-section. The narrow cross-section of the inlet restrictor 56-56' allows the inlet restrictor 56-56''' to act as a filter, preventing dirt particles and gas bubbles from passing into the pressure chamber 20. Since the inlet restrictor 56-56''' is positioned at the pressure chamber 20-20''' itself, this filter is highly effective. A narrow cross-section of the inlet restrictor 56-56''' provides the additional advantage of so-called "cross-talk filtering". Pressure waves generated in one pressure chamber 20-20' are prevented from travelling through the narrow inlet restrictor 56-56''' into a neighboring pressure chamber 20-20'''.

Since the outlet restrictor 80-80' is intended for removing dirt particles and gas bubbles from the pressure chamber 20-20''', a wider cross-section is provided for the outlet restrictor 80-80'. Particles are then allowed to be flushed from the pressure chamber 20-20' on an ink flow between the inlet and outlet restrictors 56-56''', 80-80'. The larger cross-section however also increases the risk of cross-talk, since larger cross-section of the outlet restrictor 80-80''' may allow pressure waves to travel from one pressure chamber 20-20''' to the other. The damper element 70-70' is positioned over the outlet restrictors 80-80''' to absorb any pressure waves exiting the pressure chamber 20-20''' there. The damper element 70 is formed by a flexible damper membrane 72 which seals off the first damper chamber 71. The second damper chamber 73 is positioned on the opposite side of the damper membrane 72 and over the outlet restrictors 80-80''' for receiving ink from the pressure chambers 20-20'''. Pressure waves or pulses exiting the outlet restrictor 80-80''' are absorbed by the damper membrane 72, preventing them from reaching another pressure chamber 20-20'''.

The damper element 70 in FIG. 2 is formed in the distribution layer 12 by separating the first and second damper chambers 71-71', 73-73' from on another by means of the damper membrane film 72. The damper element 70 in FIG. 2 extends over the pair of neighboring outlet restrictors 80-80'. The majority of this damper element 70 is positioned over the actuator 32 of the left one of this pair of neighboring droplet forming devices 10, 10' in FIG. 1. From the second damper chamber 73 an outlet passage 74 extends parallel to the plane of the layers 12-14 into the return line 75. The return line 75 is formed as a trench 76 in the distribution layer 12. The return line 75 is positioned over the actuator 32' of other of the pair of droplet jetting devices 10, 10'. Similarly and as shown in FIG. 1, the damper element 70' extends over the outlet restrictors 80", 80' of the other pair of droplet jetting devices 10", 10'''. For each pair of neighboring droplet jetting devices 10-10''' a single damper element 70, 70' and a single return line 75, 75' is provided. In FIG. 1, each damper element 70, 70' and respective return line 75, 75' lie in between the remote ends of the respective pressure chambers 20-20''', where the inlet restrictors 56-56''' are located. This results in a small footprint of each droplet jetting device 10-10', which allows for a high nozzle resolution.

In between pairs of adjacent outlet restrictors 80-80''' in FIG. 1, adjacent pairs of inlet restrictors 56', 56" are arranged on opposing sides of the separation wall between the pressure chambers 20', 20" of the central droplet jetting devices 10', 10" in FIG. 1. The inlet restrictors 56', 56" are connected to a single supply line 18', which is formed as trench 58' in the distribution layer 12 over both the inlet restrictors 56', 56". The cross-section of the central supply line 18' is larger than that of the supply lines 18, 18" which each supply an individual droplet jetting device 10, 10'.

The distribution layer 12 is formed of a pair of sub-layers 12A, 12C, for example silicon wafers, which are bonded to opposite sides of a membrane film 12B. The upper sub-layer 12A has been provided with through-holes to form the upper portions of the supply and return trenches 56-56", 76-76'. The first damper chambers 71, 71' are formed as recesses. The second sub-layer 12C is provided with corresponding openings for the trenches 56-56", 76-76' as well a second damper chamber 73, 73' aligned with the position of the first damper chamber 71, 71'. Additionally, outlet channels 74, 74' are provided to connect the second damper chambers 73, 73' to their respective outlet trenches 76, 76' in the sub-layer 12C. The sub-layers 12A, 12C are then adhered to the membrane film 12B, aligning the respective openings to form the trenches 56-56", 76-76' and sealing off the first damper chamber 71, 71'.

Figure 3:
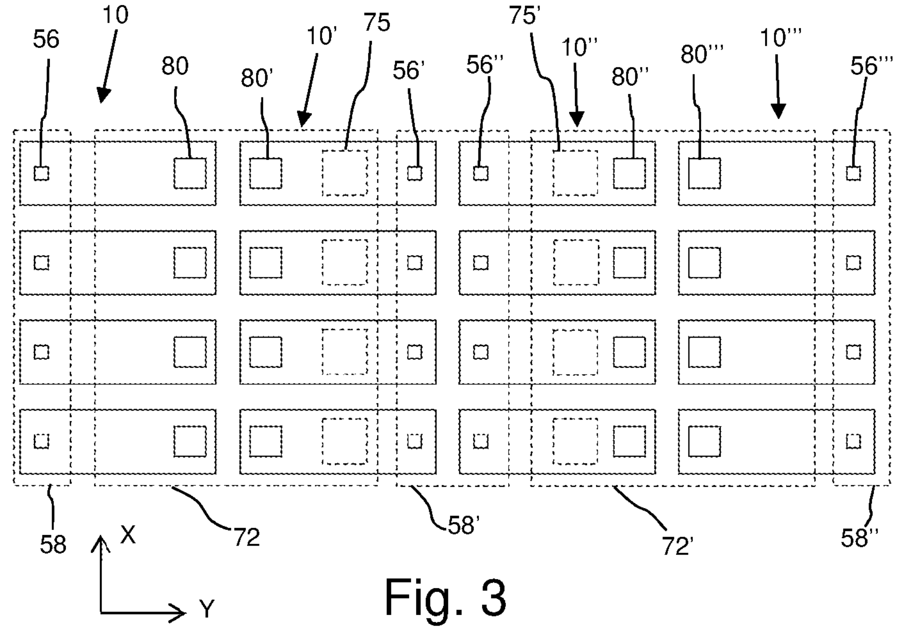
FIG. 3 is a schematic top-down view of a portion of the print head in FIG. 1.

When forming rows of large numbers of nozzles 50-50''', a single trench 58-58" can be used to supply ink to all nozzles 50-50' in a row. This is shown in FIG. 3, wherein the nozzle rows extend in the direction X. For the sake of illustration four different groups of droplet jetting devices 10-10''' in the direction X are illustrated, though in practice this number will be significantly greater, for example 300 or 600 of such units per inch. The droplet jetting devices 10-10''' as discussed for FIGS. 1 and 2 are provided in a repeating manner in the direction X. The droplet jetting devices 10-10''' are aligned along the direction X. In consequence the restrictors 56-56''', 80-80''' in FIG. 3 extend in parallel rows in direction X. A single trench 58-58" extending in the direction X is then sufficient to supply ink to the respectively aligned restrictors 56-56'. Similarly, a single membrane 72-72' is provided for forming the damper element 70-70' over the respective neighboring rows of outlet restrictors 80-80'''.

The present disclosure further relates to a process of manufacturing a large number of MEMS chips each of which includes a plurality of droplet jetting devices 10-10'''.

The membrane layer is formed by etching a doubled sided SOI wafer. On one side of the insulator layer 22 one silicon layer 26 is etched to form recesses for the rectangular pressure chambers 20-20'''. In the length direction X the pressure chambers 20-20''' are separated by separation walls of non-etched silicon. The other silicon layer 24 along with the insulator layer 22 is etched to provide the openings 28, 29 for connecting the outlet restrictor 80-80''' and inlet restrictors 56-56''' to the pressure chamber 20-20'''. An insulating silicon oxide layer 36 is the provided on the other silicon layer 24 on a side opposite the insulator layer 22. Subsequently, bottom electrodes and leads connected thereto for the actuator 32-32''' are deposited on the insulating silicon oxide layer 36. A piezo-electric material is then deposited onto the bottom electrode, followed by top electrodes, leads, an additional insulating and moisture protection layers to form a functioning actuator 32-32'''.

The nozzle layer 16 is obtained from a SOI wafer with a top silicon layer 42 and a thinner silicon layer 44 in between two insulator layers 46 and 48. A passage 52 for the nozzle 50-50' is etched through the two insulator layers 46 and 48 and the silicon layer 44. The nozzle layer 16 is bonded to the membrane layer 14 via an adhesive layer 64.

The restrictor layer 13 is formed of single silicon wafer. Inlet and outlet passages for the inlet and outlet restrictors 56-56''', 80-80''' are etched through this silicon wafer in corresponding positions and cross-sections with the openings 28, 29 in the top silicon layer 24 of the membrane layer 14. In an exaggerated view in FIG. 2 the cross-sections of the opening 28 is shown as slightly smaller than that of the outlet restrictor 80-80''' to prevent the adhesive 62 from flowing into the opening 28. This may also be applied to the opening 29. Between the inlet and outlet passages for the restrictors 56-56''', 80-80''', a recess is etched to form the actuator chamber 34-34'''. The restrictor layer 13 is then bonded onto the membrane layer 14 opposite to the pressure chambers 20-20''' by means of adhesive layer 62. Thereby, each actuator 32-32''' is sealed in its actuator chamber 34-34''' by the membrane layer 14. The inlet and outlet passages for the restrictors 56-56''', 80-80''' as well as the actuator chamber 34-34''' are positioned over its respective pressure chamber 20-20''', i.e. within the footprint or area of the pressure chamber 20-20''' when viewed in the stacking direction Z.

The distribution layer 12 is formed by bonding two silicon wafers 12A, 12C together on opposite sides of the damper membrane film 12B. One silicon wafer 12A is etched to provide passages for the supply and return lines 18-18", 75-75' as well as recesses for forming the first damper chambers 71-71', which are sealed by the damper membrane film 12B. The other silicon wafer 12C is provided with corresponding channels supply and return lines 18-18", 75-75' as well as a channel for the second damper chambers 73-73' positioned in alignment with and opposite to the first damper chambers 71-71' with respect to the damper membrane film 12B. Additionally, outlet channels 74-74' are etched in the second silicon layer 12C to provide a connection between each second damper chamber 73-73' and its adjacent return line 75-75'. The supply lines 18-18" are positioned over the inlet restrictors 56-56"', while the damper chambers 71-71', 73-73' and the return lines 75-75' are positioned as neighboring pairs between inlet restrictors 56-56'. The damper chambers 71-71', 73-73' are positioned for a major part over a respective pressure chamber 20-20"', while the return line 75-75' in fluid connection with the damper chambers 73-73' is positioned over a neighboring pressure chamber 20-20"". The distribution layer 12 is bonded to the restrictor 13 by means of an adhesive.

Although specific embodiments of the disclosure are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present disclosure being thus described, it will be obvious that the same may be varied in many ways. Such variations are not to be regarded as a departure from the spirit and scope of the present disclosure, and all such modifications as would be obvious to one skilled in the art are intended to be included within the scope of the following claims.

This application claims the benefit of EP 21197240.1, filed Sep. 16, 2021, which is hereby incorporated by reference herein in its entirety.

What is claimed is:

1. An inkjet print head comprising:

a plurality of droplet jetting devices formed of a nozzle layer defining, for each of the plurality of droplet jetting devices, a nozzle, a membrane layer carrying, on a membrane, a restrictor layer and an actuator for generating pressure waves in a liquid in a pressure chamber that is connected to the nozzle, wherein the actuator is positioned in an actuator chamber in the restrictor layer, and a distribution layer defining a supply line for supplying the liquid to the pressure chamber, and wherein the restrictor layer includes an inlet restrictor having a cross-section and an outlet restrictor positioned on opposites sides of the actuator and having a cross-section that is different from the cross-section of the inlet restrictor.

2. The inkjet print head according to claim 1, wherein the cross-section of the inlet restrictor is smaller than the cross-section of the outlet restrictor in that the cross-section of the inlet restrictor is no greater than half of the cross-section of the outlet restrictor.

3. The inkjet print head according to claim 1, wherein the cross-section of the inlet restrictor is configured to substantially prevent particles or bubbles larger than a predetermined size as well as pressure waves originating from an actuation of respective actuator from passing through the inlet restrictor.

4. The inkjet print head according to claim 1, wherein the inlet and outlet restrictors are formed as straight passages extending perpendicular to the membrane through the full thickness of the restrictor layer.

5. The inkjet print head according to claim 1, wherein the distribution layer further includes a damper element formed of a first damper chamber and a damper membrane that is flexible, and wherein the first damper chamber and the damper membrane are positioned over the outlet restrictor.

6. The inkjet print head according to claim 5, wherein the first damper chamber and the damper membrane extend partially over the actuator chamber.

7. The inkjet print head according to claim 1, wherein the inlet and outlet restrictors of neighboring droplet jetting devices alternate in position such that the outlet restrictors and inlet restrictors of neighboring droplet jetting devices are respectively positioned adjacent one another.

8. The inkjet print head according to claim 7, wherein a single supply line is formed in the distribution layer over each pair of neighboring inlet restrictors.

9. The inkjet print head according to claim 7, wherein a single damper element is formed in the distribution layer over each pair of neighboring outlet restrictors.

10. The inkjet print head according to claim 9, wherein the single damper element is connected to a return channel that is positioned over an actuator chamber and between a supply line and a damper element in the distribution layer.

11. The inkjet print head according to claim 1, wherein the distribution layer is provided on the restrictor layer.

12. The inkjet print head according to claim 1, wherein the distribution layer is formed of two wafers bonded on opposite sides of a damper membrane film.

13. The inkjet print head according to claim 1, further comprising four droplet jetting devices positioned in a row and having central droplet jetting devices, wherein the inlet restrictors of the central droplet jetting devices are positioned besides one another with a single supply channel extending over both the inlet restrictors, and wherein each pair of outer droplet jetting devices and its neighbor are a damper element positioned over both respective outlet restrictors and at least one of the actuator chambers of the four droplet jetting devices and an outlet channel connected to a second damper chamber of the damper element and to both outlet restrictors, which outlet channel extends over only one of the actuator chambers of the four droplet jetting devices.

14. The inkjet print head according to claim 1, wherein the inlet restrictor has an opening into the pressure chamber, wherein the outlet restrictor has an opening into the pressure chamber, wherein the distribution layer includes a damper element formed of a first damper chamber, a damper membrane that is flexible, and a second damper chamber on an opposite side of the damper membrane to the first damper chamber and in fluid connection with the outlet restrictor, wherein the first, damper chamber, the second damper chamber, and the damper membrane are positioned over the outlet restrictor, and wherein the second chamber and the damper membrane extend partially over the actuator chamber.

15. The inkjet print head according to claim 14, wherein the inlet and outlet restrictors extend from the membrane away from the pressure chamber, which pressure chamber is positioned on an opposite side of the membrane with respect to the restrictor layer.

16. The inkjet print head according to claim 1, wherein the inlet and outlet restrictors are positioned over the pressure chamber.

17. The inkjet print head according to claim 1, wherein the inlet and outlet restrictors extend from the membrane away from the pressure chamber, which pressure chamber is positioned on an opposite side of the membrane with respect to the restrictor layer.

18. A method of forming an inkjet print head, the method comprising:

forming a restrictor layer having actuator chamber recesses and inlet passages for inlet restrictors and outlet passages for outlet restrictors, wherein a cross-section of the inlet passages is smaller than a cross-section of the outlet passages, and wherein between neighboring actuator chamber recesses either a pair of adjacent inlet passages or a pair of outlet passages is provided in an alternating manner;

attaching a membrane layer having actuators bonded on a flexible membrane to the restrictor layer such that each actuator is sealed in its respective actuator chamber recess by the flexible membrane; and attaching a nozzle layer to the membrane layer such that pressure chambers are formed on an opposite side of the flexible membrane with respect to the actuators, wherein each pressure chamber is in fluid connection with a respective inlet passage, outlet passage, and a nozzle formed in the nozzle layer.

19. The method according to claim 18, further comprising:

forming a distribution layer by bonding a first distribution wafer and a second distribution wafer to opposite sides of a damper membrane film that is flexible, wherein the distribution layer includes supply lines, return lines, and damper elements formed by recesses formed in the first distribution wafer and sealed by the damper membrane film; and attaching the distribution layer to the restrictor layer such that a damper element is positioned over each pair of neighboring outlet restrictors.

* * * * *